United States Patent
Demir et al.

(10) Patent No.: US 7,689,235 B2
(45) Date of Patent: Mar. 30, 2010

(54) UNSUITABLE CELL EXCLUSION IN WIRELESS COMMUNICATION SYSTEMS

(75) Inventors: Alpaslan Demir, East Meadow, NY (US); Donald M. Grieco, Manhassett, NY (US); John W. Haim, Baldwin, NY (US); Andrew F. Bednarz, Garden City, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 17 days.

(21) Appl. No.: 12/001,162

(22) Filed: Dec. 10, 2007

(65) Prior Publication Data

US 2008/0090600 A1    Apr. 17, 2008

Related U.S. Application Data

(63) Continuation of application No. 10/764,087, filed on Jan. 23, 2004, now Pat. No. 7,308,258.

(60) Provisional application No. 60/442,087, filed on Jan. 23, 2003.

(51) Int. Cl.
*H04B 7/00* (2006.01)
(52) U.S. Cl. .................. 455/502; 455/550.1; 455/434; 455/436; 455/437; 455/440
(58) Field of Classification Search ............ 455/502, 455/550.1, 434, 436, 437, 440, 422.1, 435.1
See application file for complete search history.

(56) References Cited

U.S. PATENT DOCUMENTS

| 5,722,070 | A | | 2/1998 | Alford |
| 6,058,136 | A | * | 5/2000 | Ganesh et al. .............. 375/130 |
| 6,148,203 | A | * | 11/2000 | Renko et al. ................ 455/434 |
| 6,226,527 | B1 | * | 5/2001 | Dalsgaard et al. ........ 455/553.1 |
| 6,480,558 | B1 | | 11/2002 | Ottoson et al. |
| 6,490,313 | B1 | * | 12/2002 | Ganesh et al. .............. 375/130 |
| 6,526,091 | B1 | * | 2/2003 | Nystrom et al. ............. 375/142 |
| 6,618,432 | B1 | * | 9/2003 | Ganesh ...................... 375/147 |
| 6,717,930 | B1 | | 4/2004 | Sezgin et al. |
| 7,158,505 | B2 | | 1/2007 | Dick et al. |
| 2002/0034944 | A1 | | 3/2002 | Tanno et al. |
| 2002/0075833 | A1 | | 6/2002 | Dick et al. |
| 2002/0118705 | A1 | | 8/2002 | Sezgin et al. |
| 2003/0086401 | A1 | | 5/2003 | Lee et al. |

FOREIGN PATENT DOCUMENTS

| EP | 1 168 696 | 1/2002 |
| EP | 1 263 256 | 12/2002 |

* cited by examiner

*Primary Examiner*—Joseph H Feild
*Assistant Examiner*—Huy D Nguyen
(74) *Attorney, Agent, or Firm*—Volpe & Koenig, P.C.

(57) ABSTRACT

A method for performing initial cell search in wireless communication system wherein unsuitable cells includes searching stored frequencies exhaustively and initial frequencies non-exhaustively. Initial frequencies may be searched exhaustively in certain circumstances. When performing exhaustive initial cell searches, primary synchronization codes that lead to unsuitable cells are excluded from subsequent initial cell searches performed on the same frequency.

6 Claims, 7 Drawing Sheets

UNSUITABLE CELL EXCLUSION IN WIRELESS COMMUNICATION SYSTEMS

CROSS REFERENCE TO RELATED APPLICATIONS

This application is a continuation of U.S. application Ser. No. 10/764,087, filed Jan. 23, 2004, which claims priority from U.S. Provisional Application No. 60/442,087, filed on Jan. 23, 2003, all of which are incorporated by reference as if fully set forth.

FIELD OF INVENTION

The present invention relates to wireless communication systems. More specifically, the present invention relates to initial cell search in such systems.

BACKGROUND

Figure 1:
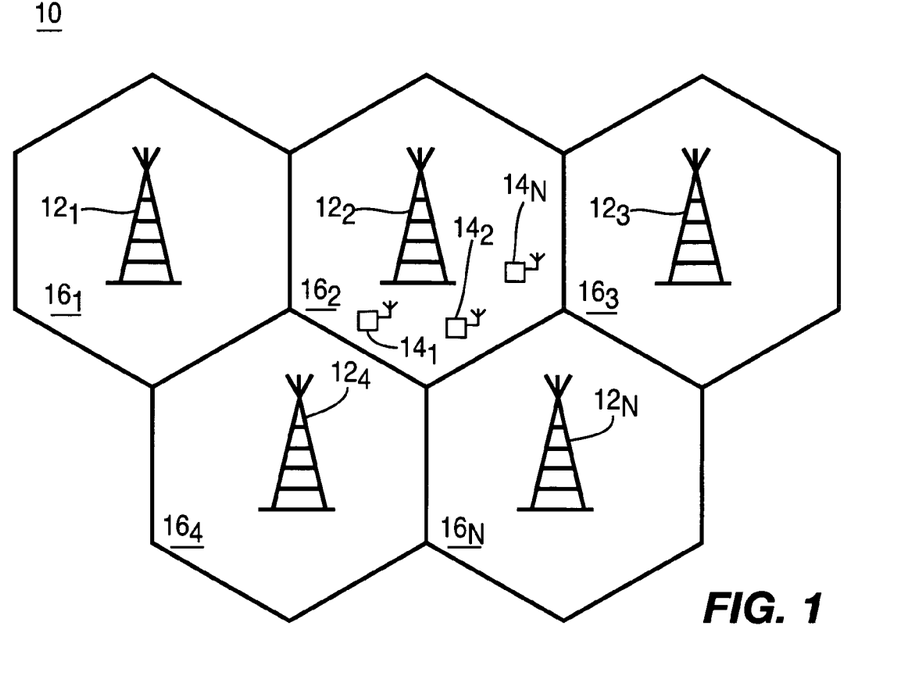
FIG. 1 is a conventional wireless communication system.

FIG. 1 illustrates a wireless communication system 10. The communication system has a plurality of base stations $12_1$-$12_n$ (12). Each base station 12 communicates with wireless transmit/receive units (WTRUs) $14_1$-$14_n$ (14) within its operating area or cell $16_1$-$16_n$ (16). When a WTRU 14 is first activated, it is unaware of its location and with which base station 12 (or cell 16) to communicate. The process where the WTRU 14 determines the cell 16 to communicate with is referred to as "initial cell search."

Figure 2:
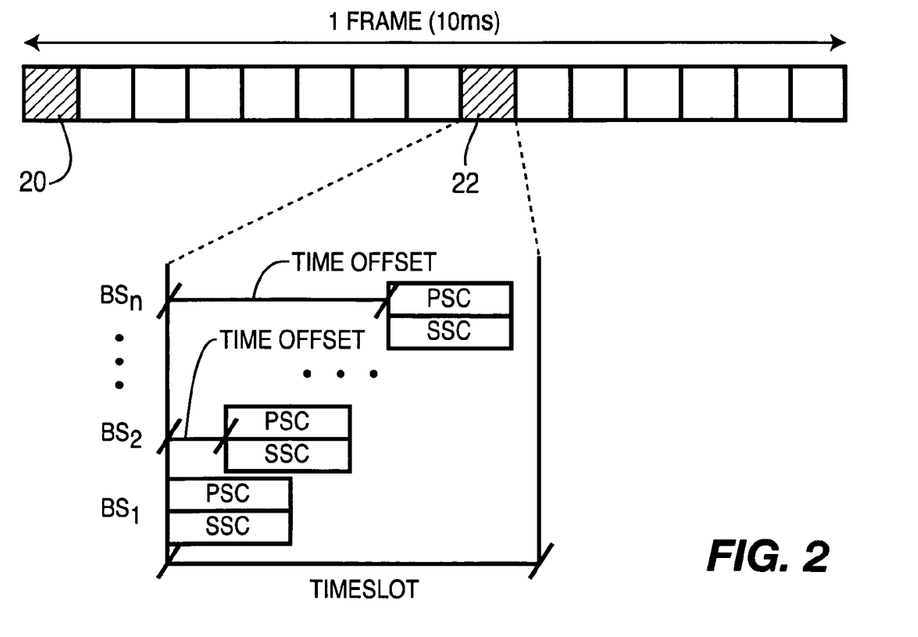
FIG. 2 is a frame and an exploded view of a timeslot within the frame.

Initial cell search (ICS) in the proposed time division duplex mode of wideband code division multiple access, by way of example, typically comprises three steps. In step one, a WTRU searches for a primary synchronization code (PSC). Each base station transmits the same PSC in a primary synchronization channel (PSCH). The PSCH may be transmitted in one or two timeslots depending on the manner in which the system is implemented. In FIG. 2, the PSCH is shown being transmitted in two timeslots 20, 22. As shown in the exploded view of timeslot 22, each base station's PSC is offset in time according to a particular time offset. The time offset, typically expressed as particular number of signaling units called "chips," is provided to reduce interference between secondary synchronization codes (SSCs) which are simultaneously transmitted along with each PSC by each base station in a system. The PSC that is selected by the WTRU is the one for which the WTRU has measured the highest power.

In step 2, the SSCs transmitted along with the selected PSC are used to determine the timeslot offset of the detected PSC and the code group. Then, in step 3, the scrambling code and unique midamble base identification number are determined.

This approach to initial cell search has drawbacks. One drawback is where a detected PSC leads to a cell belonging to a PLMN with which the WTRU may not communicate for whatever reason (e.g. a WTRU on a first network detecting a PSC leading to a cell of a second network wherein there is no shared-use agreement between the two networks). In this case, the WTRU will read the broadcast channel (BCH) of the unsuitable cell, realize that it is an unsuitable cell and begin another initial cell search. The problem is that while running subsequent initial cell searches, the WTRU often detects the same PSC and is led to the same unsuitable cell. This is inefficient in that the WTRU is wasting time and resources running additional initial cell searches for PSC's that lead to unsuitable cells and wasting additional time and resources reading the BCH of unsuitable cells and may eventually cause the initial cell search to fail based on a timeout.

It is therefore desirable to have a method and system for running initial cell search without such limitations.

SUMMARY

A method for performing initial cell search in wireless communication system wherein unsuitable cells includes searching stored frequencies exhaustively and initial frequencies non-exhaustively. Initial frequencies may be searched exhaustively in certain circumstances. When performing exhaustive initial cell searches, primary synchronization codes that lead to unsuitable cells are excluded from subsequent initial cell searches performed on the same frequency.

DETAILED DESCRIPTION OF THE PREFERRED EMBODIMENT(S)

Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

As mentioned, WTRUs perform an initial cell search when turned on (or otherwise need to find a cell with which to communicate). WTRUs typically include a plurality of frequencies on which they are capable of communicating. WTRUs therefore set their synthesizer to a particular frequency and run the initial cell search (ICS) process for that frequency. If the WTRU is not able to find a cell with which to communicate at a particular frequency, the WTRU will set its synthesizer to another frequency and begin searching that frequency (i.e. performing an initial cell search for the newly selected frequency).

Often times, a WTRU is able to identify a cell with which to communicate as a result of performing an initial cell search at a particular frequency only to determine after reading the cell's broadcast channel (BCH) that the cell is unsuitable. A cell is unsuitable with respect to a particular WTRU where the cell belongs to a public land mobile network (PLMN) on which the WTRU cannot operate. Typically, a WTRU may operate on the network of its own carrier (say carrier A) and any other carriers with which carrier A has an agreement with respect to sharing network hardware.

The types of frequencies on which WTRUs are capable of communicating may be broken down into two groups, stored and initial. Stored frequencies are those frequencies that are stored in the WTRU, either directly or by way of a SIM card or some other type of removable storage medium. The stored frequencies are frequencies where there is a higher (higher with respect to initial frequencies) likelihood of finding a suitable cell while performing initial cell search. For example, as explained in the previous paragraph, the stored frequencies may be frequencies of not only the carrier with which the WTRU is associated (say carrier A), but also other carriers with which carrier A has an agreement with respect to sharing network hardware. Initial frequencies are frequencies on which a WTRU may communicate, but there is a lower likelihood of finding a suitable cell with which to communicate. Purely by way of example, a WTRU may be capable of communicating on a hundred frequencies wherein ten are stored frequencies and ninety are initial frequencies.

Generally, as explained above, there is a higher likelihood of finding a suitable cell when searching on a stored frequency. Therefore, stored frequencies are preferably searched exhaustively. To search a frequency exhaustively means that where the initial cell search leads to an unsuitable cell, initial cell search is run again at the same frequency with an exclusion window around the PSC chip-offset which led to the unsuitable cell. Initial frequencies, in contrast, are preferably search non-exhaustively and will only be search exhaustively in certain circumstances as explained in greater detail below.

Figure 3:
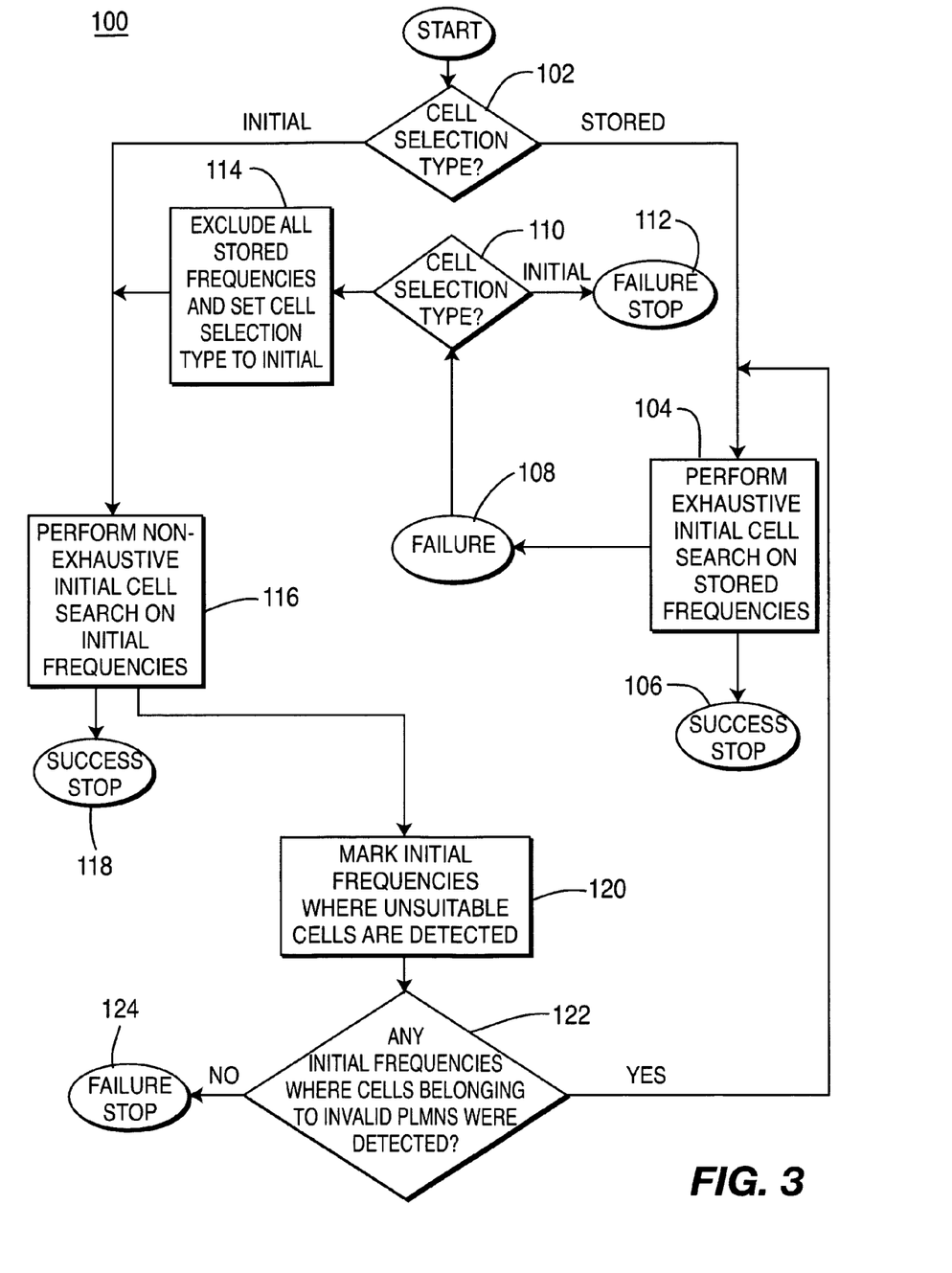
FIG. 3 is a first embodiment of a method for performing initial cell search using unsuitable cell exclusion logic.

Referring now to FIG. 3, a first embodiment of a method 100 for performing initial cell search using unsuitable cell exclusion logic is shown. The method begins in step 102 by determining the cell selection type. The cell selection type is dependent upon whether the frequencies being search are stored or initial. Therefore, the cell selection type is also referred to as being either stored or initial. If the cell selection type is stored (i.e. stored frequencies are being searched), the method 100 proceeds to step 104. In step 104, an exhaustive initial cell search is performed on the stored frequencies. An exhaustive initial cell search is one that in situations where an initial cell search on a particular frequency leads to an unsuitable cell, subsequent initial cell searches are performed at that same frequency with an exclusion window around the PSC chip-offset which led to the unsuitable cell. Further details regarding how an exhaustive initial cell search (i.e. an exhaustive search) is performed is described in connection with FIG. 6. If there is a success at any time while performing the exhaustive search, the method 100 stops 106. If there is a failure 108, the method proceeds to step 110. In step 110, the cell selection type is again determined. The cell selection type is determined again because, as will be explained in steps 116, 118, and 120, an exhaustive cell search may be performed on initial frequencies in certain circumstances. In this case, the cell selection type is stored so the method 100 proceeds to step 114 where all stored frequencies are excluded and the cell selection type is set to initial. Then, in step 116, a non-exhaustive initial cell search is performed on the initial frequencies. A non-exhaustive initial cell search is where only a single initial cell search is run for each frequency. That is, where an unsuitable cell is found on an initial frequency, because it is only an initial frequency, it is not worth performing subsequent initial cell searches on that frequency. Therefore, in non-exhaustive initial cell search, where an unsuitable cell is detected, the WTRU sets its synthesizer to another initial frequency and starts another non-exhaustive initial cell search. Further details regarding non-exhaustive initial cell searches (i.e. non-exhaustive searches) are described in connection with FIG. 5. Of course, if in step 102, the cell selection type is initial, the method 100 also proceeds to step 116.

If in step 116, there is a success, the method 100 stops in step 118. If not, the method 100 proceeds to step 120. In step 120, any initial frequencies wherein a cell was detected, but was later determined to be unsuitable (i.e. because the cell belongs to an invalid PLMN with respect to the WTRU performing the non-exhaustive initial cell search) is marked. These frequencies are marked so that they may be searched exhaustively because once the stored frequencies are searched, they represent the best chance at finding a suitable cell. That is, once an exhaustive initial cell search has been performed on the stored frequencies and a cell has not been found, the next best thing is to exhaustively search the initial frequencies where a cell, albeit an unsuitable one, was found while performing a non-exhaustive initial cell search.

Therefore, from step 120, the method proceeds to step 122. In step 122, it is determined whether there are any initial frequencies where cells belonging to invalid PLMNs were detected (i.e. unsuitable cells). If there are no such initial frequencies, total failure is declared and the method 100 stops in step 124. If there are such initial frequencies, they are searched exhaustively in step 104. Again if there is a success, the method 100 stops in step 106. If there is a failure (step 108) the cell selection type is determined in step 110. In this case, the cell selection type is initial so total failure is declared and the method 100 stops in step 112.

Figures 4, 4A:
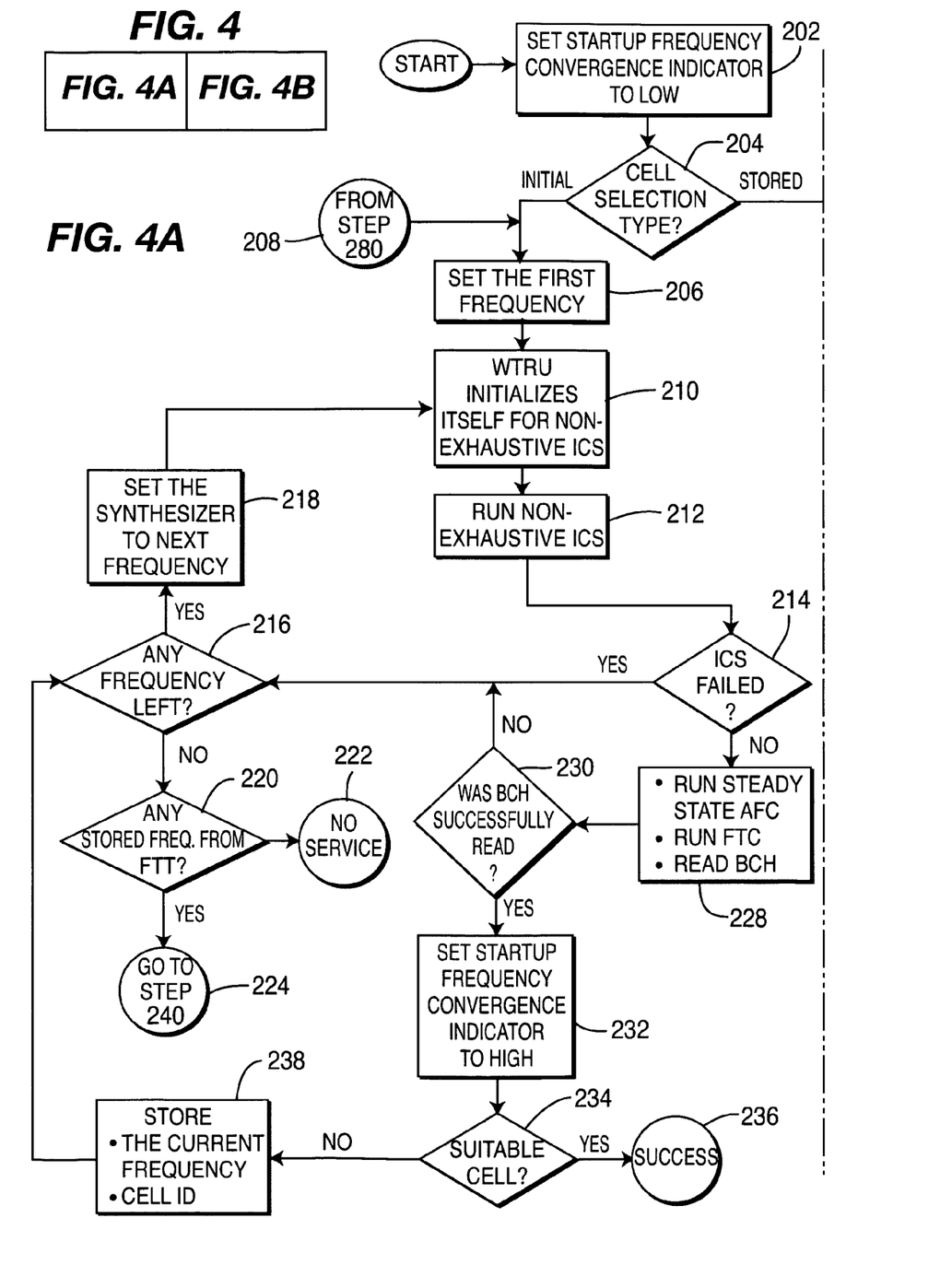
FIG. 4 is a second embodiment of a method for performing initial cell search using unsuitable cell exclusion logic.
Figure 4B:
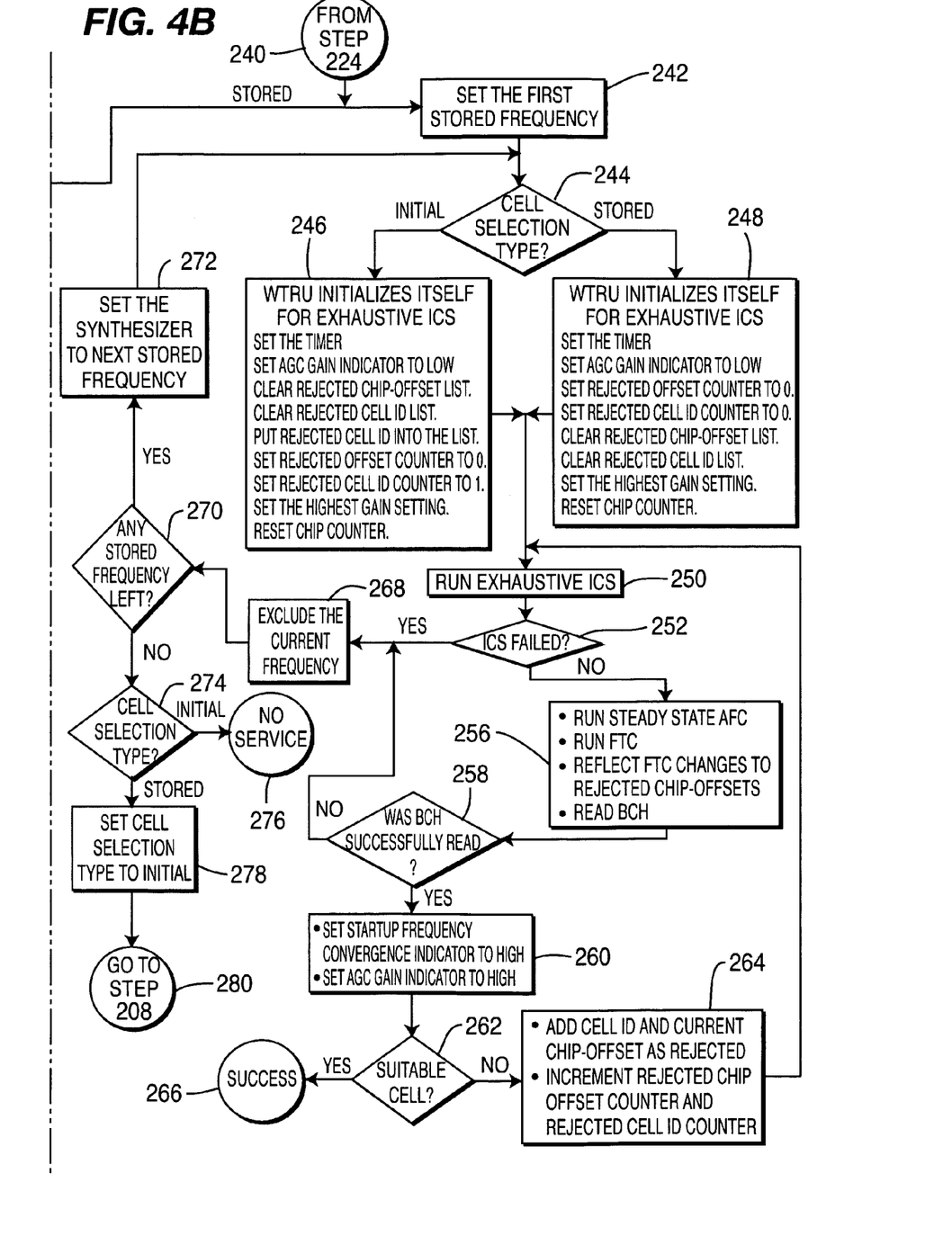

Referring now to FIG. 4, there is shown another embodiment of a method 200 for performing initial cell search using unsuitable cell exclusion logic. The method begins in step 202 by setting the startup frequency convergence indicator to LOW. As explained, initial cell search is performed on a particular frequency, either stored or initial. The particular frequency corresponds to a frequency on which it is expected to find a cell. The cell will be transmitting at a particular frequency with very high accuracy because of its very high quality oscillator. In order for a WTRU to properly run the initial cell search, the WTRU needs to actually be generating a replica of the transmitted frequency within an acceptable degree of error. That is, base stations typically have very high quality oscillators while WTRUs typically have inexpensive oscillators that do not always generate the same frequency in its synthesizer. Therefore, it is often necessary to utilize a frequency controller to reduce the offset in frequency between WTRUs and base stations. The initial cell search may require less stringent frequency offsets; however, reading the BCH may require a very limited frequency offset. Reduction of this offset to an acceptable degree is referred to as convergence (i.e. the point at which the WTRU can read a cell's BCH). When the startup frequency convergence indicator is set to LOW, it indicates that there is no convergence. That is, the frequency at which the WTRU is transmitting is not within an acceptable degree of the frequency the WTRU set its synthesizer to. As mentioned above, the startup frequency convergence indicator is initially set to LOW in step 202.

The method 200 then proceeds from step 202 to step 204 where the cell selection type is identified. Where the cell selection type is initial, the method 200 proceeds to step 206 where the WTRU sets the first frequency. That is, the WTRU sets its synthesizer to the first initial frequency (i.e. the first non-stored frequency the WTRU is capable of transmitting at). Once the first initial frequency is set, the WTRU initializes itself for performing a non-exhaustive initial cell search in step 210. That is, for example, the clocks (i.e. chip clock, timeslot clock, and frame clock) and chips are reset and the buffers are flushed. Then in step 212, the WTRU performs a non-exhaustive initial cell search and in step 214, it is determined whether the non-exhaustive search failed. The details of performing a non-exhaustive cell search are described in connection with FIG. 5.

If the non-exhaustive initial cell search did not fail, the method 200 proceeds from step 214 to step 228. Assuming the non-exhaustive search did not fail, the WTRU obtains a cell identifier, a chip offset location, timeslot offset, and frame boundary information regarding the cell detected as a result of the initial cell search. In step 228, the WTRU performs steady state AFC, a first significant path identifier (FTC) algorithm, and reads the BCH. The steady state AFC reduces the offset in frequency between the frequencies at which the WTRU and cell are transmitting down to a sufficient degree so that the WTRU may read the cell's BCH. By way of example, the steady state AFC preferably reduces this offset to approximately 100 Hz (i.e. approximately one hundred cycles per second). The FTC algorithm provides an estimate of the beginning of the BCH response. Once these items, as well as anything else required to read the BCH of the identified cell, are complete, the method 200 proceeds to step 230 to determine if the BCH was successfully read. The BCH may not be successfully read because of poor signaling conditions, for example.

If the BCH is not successfully read, the method 200 proceeds from step 230 to step 216 and continues as explained below. If the BCH is successfully read, the startup convergence indicator is set to high in step 232 meaning that the convergence is sufficient to allow the WTRU to read the BCH. By reading the cell's BCH, it may be determined whether the cell belongs to a desirable PLMN (i.e. a PLMN on which the WTRU may operate). In step 234, it is determined whether the cell is suitable or not. The determination of whether the cell is suitable or not is made based on the PLMN ID which is obtained by reading a cell's BCH. If the cell belongs to a PLMN on which the WTRU may operate, the cell is suitable. If the cell belongs to a PLMN on which the WTRU may not operate, the cell is not suitable. If the cell is suitable, there is a success and the WTRU beginning operating using that cell (step 236). If the cell is not suitable, the cell ID of the cell and the frequency on which the cell was found are stored in step 238, and the method 200 proceeds to step 216 and continues as explained below. It is noted that in step 238, the cell IDs of any neighboring cells are also preferably stored so that they (along with the cell ID of the unsuitable cell) may be added to a rejected cell list so that those cells are automatically excluded (i.e. without having to read their BCH) if they are detected in any future initial cell searches.

If, referring again to step 214, the non-exhaustive initial cell search failed, the method 200 proceeds from step 214 to step 216 to determine if there are any more initial frequencies to search. If yes, the WTRU sets it synthesizer to the next initial frequency (step 218) and returns to step 210 and continues as described above. If there are no more initial frequencies to search, the method 200 proceeds from step 216 to step 220 to determine if any initial frequencies were stored as a result of getting a hit on a PSC that led to an unsuitable cell (i.e. a cell with an undesired PLMN ID as explained above). If no, there is no service currently available and the method 200 ends at step 222. If yes, the method 200 proceeds to step 224 wherein the method 200 is directed to step 240 so that an exhaustive search may be performed for this frequency.

Referring again to step 204, if the cell selection type is stored the method 200 proceeds from step 204 to step 242 where the WTRU sets it synthesizer to the first stored frequency. Then, in step 244, the cell selection type is again determined. Note, this is necessary because as explained above, the method 200 may have proceeded to step 242 and then 244 as a result of not only step 204, but also step 224.

If the cell selection type is initial, the WTRU initializes itself in step 246, for example, by preferably performing the following steps:

setting the timer(s) (i.e. chip counter, timeslot counter, etc.)
    setting the AGC gain indicator to LOW (i.e. indicate that there has not been any detection yet and the AGC gain indicator is not fixed yet)
    clearing the rejected chip offset list
    clearing the rejected cell ID list
    putting the rejected cell ID, and preferably the cell IDs of its neighbors, into the rejected cell ID list
    setting the rejected offset counter to zero
    setting the rejected cell ID counter to one
    setting the highest gain setting to maximize probability of detecting a PSC
    resetting the chip counter If the cell selection type is stored, the WTRU initializes itself in step 248, for example, by preferably performing the following steps:

setting the timer(s) (i.e. chip counter, timeslot counter, etc.)
    setting the AGC gain indicator to LOW
    setting the rejected offset counter to zero
    setting the rejected cell ID counter to zero
    clearing the rejected chip offset list
    clearing the rejected cell ID list
    setting the highest gain setting to maximize probability of detecting a PSC
    resetting the chip counter Once the initialization is complete (either initial or stored), the method 200 proceeds to step 250 wherein an exhaustive initial cell search is performed. The details of performing an exhaustive cell search are described in connection with FIG. 6.

In step 252, it is determined whether the exhaustive initial cell search failed or not. If it did not, the method 200 proceeds from step 252 to step 256. In step 256, steady state AFC algorithm, FTC algorithm, and possibly others (as known to those skilled in the art) are run and the BCH of the cell in the initial cell search is read. In this case, it is necessary to reflect FTC changes to rejected chip offsets. It is necessary to reflect the FTC changes because an FTC algorithm determines the beginning of the channel impulse response based on the chip-offset movements with respect to frequency offset, or changes due to channel conditions and advances or delays at the beginning of the channel impulse response through the main clock which effects the counters (i.e. the chip counter, timeslot counter, etc.).

Next, in step 258, it is determined whether the BCH was successfully read. If the BCH was successfully read, the method 200 proceeds to step 260 wherein the startup frequency convergence indicator is set to high and the AGC gain indicator is also set to high. Setting the startup frequency convergence indicator to high means that there is a sufficient degree of frequency convergence to read the BCH and that the BCH was read. The significance of setting the AGC gain indicator to high indicates that the gain setting is acceptable.

From step 260, the method 200 proceeds to step 262 wherein it is determined whether the cell is suitable or not. If the cell is not suitable, the method 200 proceeds form step 262 to step 264. In step 264, the cell ID and current chip-offset are added to a rejected cell ID list and rejected chip-offset list, respectively. It is noted that the chip-offset of a rejected cell is the chip at which the PSC leading to the unsuitable cell is found within a frame for the frequency on which the exhaustive initial cell search is being run. It is noted that in step 264, it is preferable to not only add the cell ID of the unsuitable cell, but also the cell IDs of the unsuitable cell's neighbors. This is because typically the neighbors of an unsuitable cell are also unsuitable and belong to the same PLMN. Also, in step 264, the rejected chip-offset counter and rejected cell ID counter are incremented. From step 264, the method 200 goes back to step 250 and continues as described above. If the cell is suitable, there is a success and the method 200 ends in step 266.

Referring again to step 258, if the BCH was not read successfully, the method 200 proceeds from step 258 to step 268. Referring again to step 252, if the exhaustive cell search did fail, the method 200 also proceeds to step 268. In step 268, the frequency at which the exhaustive initial cell search was performed is excluded. Where initial cell search has failed at a particular frequency, it is obvious that that frequency should be excluded. However, it is important to note that where the BCH cannot be read successfully, the frequency should also be excluded. This is because in the exhaustive cell search procedure of the present invention, any detected cells are detected at the highest peak. Therefore, if the BCH cannot be read with the detected highest peak, there is no point in further searching for subsequent peaks with less energy in that frequency and the frequency should therefore be excluded.

From step 268, the method 200 proceeds to step 270. In step 270, it is determined whether there are any additional stored frequencies to search. If there are additional frequencies, the WTRU's synthesizer is set to the next stored frequency in step 272 and the method 200 continues at step 244 as explained above. If there are no additional frequencies, the method 200 proceeds from step 270 to step 274.

In step 274, the cell selection type is determined. If it is initial (i.e. an initial frequency that ended up being stored because of a hit to an unsuitable cell), there is a failure and no service is currently available and the method 200 ends in step 276. If the cell selection type is stored, the cell selection type is set to initial in step 278 and the method 200 jumps to step 208 in step 280.

Figure 5:
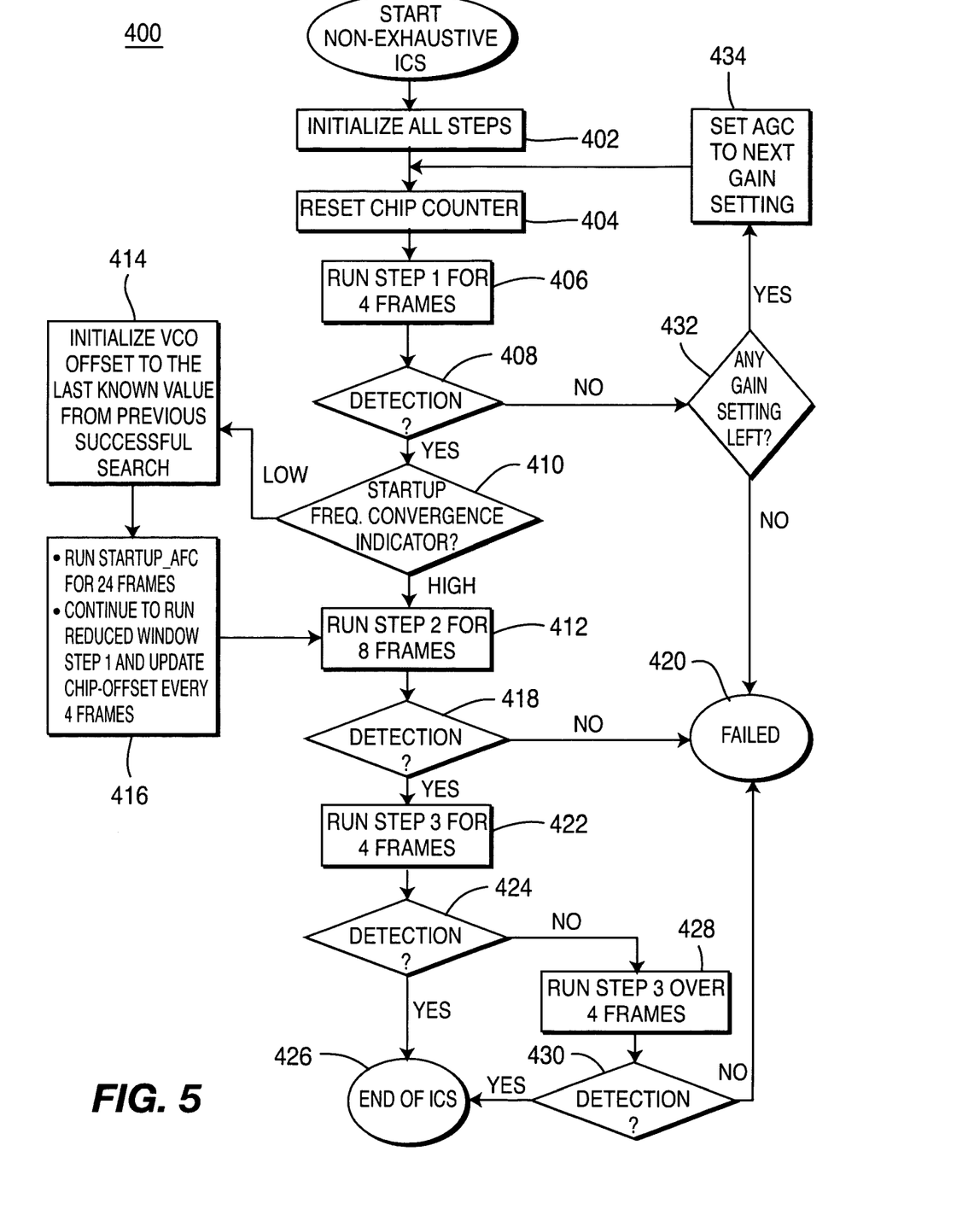
FIG. 5 is a method for performing a non-exhaustive initial cell search.

Referring to FIG. 5, there is shown a method 400 for performing a non-exhaustive initial cell search. The method 400 begins in step 402 with initialization of all steps of initial cell search (i.e. steps 1, 2, and 3 of initial cell search). Then, in step 404, the chip counter is reset. Next, in step 406, step 1 of initial cell search is run for preferably four frames. Of course, it may be run for any number of frames as desired. As previously explained, in step 1 of initial cell search, the WTRU is looking for the PSC correlator peak location with the highest power.

In step 408, it is determined whether there is a detection of a PSC or not. If there is a detection of a PSC, the method 400 proceeds to step 410 wherein it is determined whether the startup frequency convergence indicator is set to high or low. If high, the method 400 proceeds directly from step 410 to step 412 where step 2 of initial cell search is run for eight frames. Again, step 2 may be run for any number of frames, as desired. As previously explained, in step 2 of initial cell search, the SSCs transmitted along with the detected PSC are used to determine the timeslot offset of the detected PSC location and the code group. If, in step 410, the startup frequency convergence indicator is low, the method 400 proceeds from step 410 to step 414. In step 414, the voltage controlled oscillator (VCO) of the WTRU running the search is initialized to the last known value from the WTRU's previous successful initial cell search or from the last known best value. Then, in step 416, a startup AFC algorithm is run for preferably twenty-four frames to reduce, preferably to 2 kHz, any offset between frequencies in the WTRU and base station. From step 416, the method 400 proceeds to step 412 where, as mentioned, step 2 of initial cell search is run for eight frames.

From step 412, the method 400 proceeds to step 418 to determine if there has been a detection of the SSCs. If not, there is a failure (step 420). If there is a detection, step 3 of initial cell search is run for four frames (step 422). As previously explained, in step 3 of initial cell search, the scrambling code and unique midamble base identification number are determined. In step 424, it is determined whether there was a detection while running step 3 of initial cell search. If there was a detection, the method 400 ends in step 426. In there was no detection, step 3 is run for another four frames in step 428. In steps 424 and 428, four frames is preferred, but step 3 may be run over any number of frames as desired. If there is a detection (step 430), the method 400 ends in step 426. If not, there is a failure and the method 400 ends in step 420.

Referring again to step 408, if there is no detection in step 1, the method 400 proceeds from step 408 to 432. In step 432, it is determined whether there are any gain settings left. If there are no gain settings left, there is a failure and the method 400 ends in step 420. If there are additional gain settings left, the method 400 proceeds to step 434 where the automatic gain controller (AGC) of the WTRU is set to the next gain setting. By way of explanation, the gain setting is the amount an analog signal is amplified before being put into an analog-to-digital converter. There are typically four gain settings and the one that is used first is typically the highest. Therefore, in step 434, the automatic gain controller (AGC) will preferably be set to the next lowest gain setting. Once the AGC is set to the next gain setting, the method 400 proceeds to step 404 and continues as described above.

Figure 6:
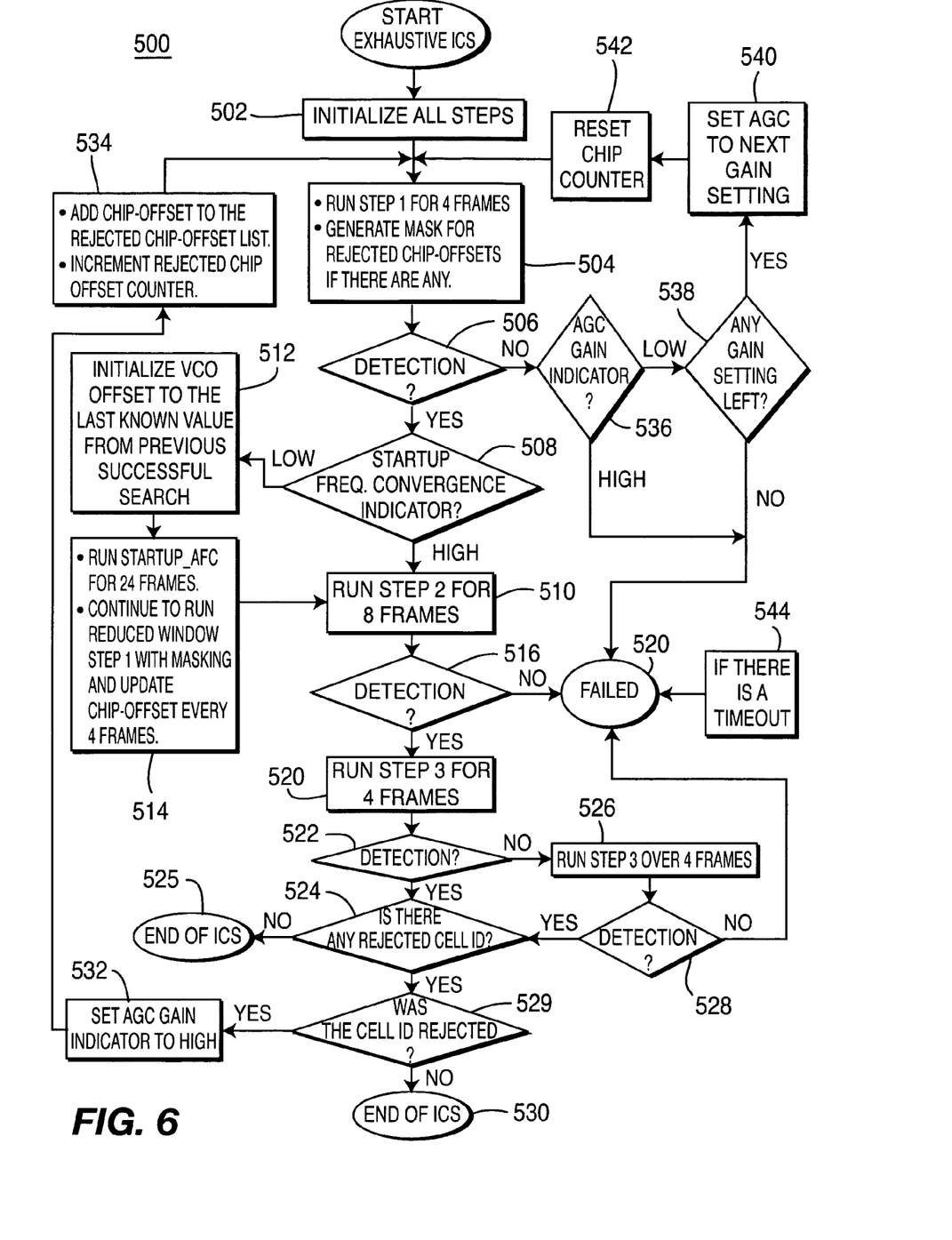
FIG. 6 is a method for performing an exhaustive initial cell search.

Referring now to FIG. 6, there is shown a method 500 for performing an exhaustive initial cell search. The method 500 begins in step 502 with initialization of all steps of initial cell search (i.e. steps 1, 2, and 3 of initial cell search). Then, in step 504, step 1 of initial cell search is run, preferably for four frames. Step 1 may of course be run for any number of frames as desired. A mask is generated for any rejected chip-offsets. As explained, a rejected chip-offset corresponds to the location of PSCs that have previously led to unsuitable cells.

Next, in step 506, it is determined whether there has been a detection of a PSC or not. If there has been a detection of a PSC, the method 500 proceeds to step 508 where it is determined whether a startup frequency convergence indicator of the WTRU performing the search is high or low. If it is high, the method 500 proceeds directly from step 508 to step 510 where step 2 of initial cell search is run for eight frames. Again, step 2 may be run for any number of frames, as desired. If, in step 508, the startup frequency convergence indicator is low, the method 500 proceeds to step 512. In step 512, the voltage controlled oscillator (VCO) of the WTRU running the search is initialized to the last known value from the WTRU's previous successful initial cell search or from the last known best value. Then, in step 514, a startup AFC algorithm is run for preferably twenty-four frames to reduce, preferably to 2 kHz, any offset between frequencies in the WTRU and base station. From step 514, the method 500 proceeds to step 510 where, as mentioned, step 2 of initial cell search is run for eight frames.

From step 510, the method 500 proceeds to step 516 to determine if there has been a detection of the SSCs. If not, there is a failure (step 518). If there is a detection, step 3 of initial cell search is run for four frames (step 520). While four frames is preferred, step 3 may of course be run for as many frames as desired. In step 522, it is determined whether there was a detection while running step 3 of initial cell search. If there was a detection, the method 500 proceeds to step 524. If there was no detection, the method 500 proceeds to step 526 wherein step 3 of initial cell search is run for another four frames. If, in step 528, it is determined that there is still no detection, the method 500 ends in failure in step 520. If, in step 528, it is determined that there is a detection, the method 500 proceeds to step 524.

In step 524, it is determined whether there are any rejected cell IDs. If no, the initial cell search is successful and the method 500 ends in step 525. If yes, the method 500 proceeds to step 529 to determine whether the cell ID of the detected cell is in the rejected cell ID list. If no, the method 500 is successful and ends in step 530. If yes, the AGC gain indicator is set to high in step 532 which indicates that that the gain was set properly to continue searching for other peaks at step 1. Then in step 534 the chip-offset at which the PSC was located is added to the rejected chip-offset list and the rejected chip-offset counter is incremented. From step 534, the method 500 proceeds to step 504 and continues as described herein.

Another way of implementing a cell ID rejection may be utilized in step 2 processing. It is known by those skilled in the art that the adjacent cells in a physical location cannot be in the same code group. Therefore, if a cell ID is rejected, it can be associated to a code group number. If the rejected code group numbers are listed during step 2 where rejected group numbers are not tested for detection, the step 2 outcome is guaranteed to generate an accepted code group number if it is successful. Therefore, the step 3 is guaranteed to generate a different cell ID each time it is successful. The rejection in step 2 can make PLMN exclusion process faster.

Referring again to Step 506, if there is no detection in step 1, the method 500 proceeds to step 536. In step 536, it is determined whether the AGC gain indicator is high or low. If high, the method 500 ends in failure in step 520. Where there is no detection in step 1 and the AGC gain indicator is set to high, the initial cell search is considered failed because of that PSC correlations cannot even be detected at their highest peaks. Therefore, if there is no PSC detection, there is no point in further continuing the exhaustive initial cell search at that frequency and the search is considered failed.

If the AGC gain indicator is low, the method 500 proceeds from step 536 to 538 where it is determined whether there are any gain settings left. If there are no gain settings left, the method 500 has failed (step 520). If there are gain settings left, the AGC is set to the next lowest gain setting in step 540. The reason why gain settings are utilized from highest to lowest is that, as known to those skilled in the art, if an input signal is saturated by a high gain level, there will be degradation in detection performance; however, a signal may still be detected. If the signal degradation due to saturation is too much that the signal cannot be detected, a lower gain setting will reduce the amount of saturation thereby increasing the chances of being able to detect the signal.

From step 540 the method 500 proceeds to step 542 where the chip counter is reset. Then, the method 500 continues at step 504 as explained above. Of course, if a timeout occurs (step 544) while running method 500, the method 500 is considered failed (step 520).

Figure 7:
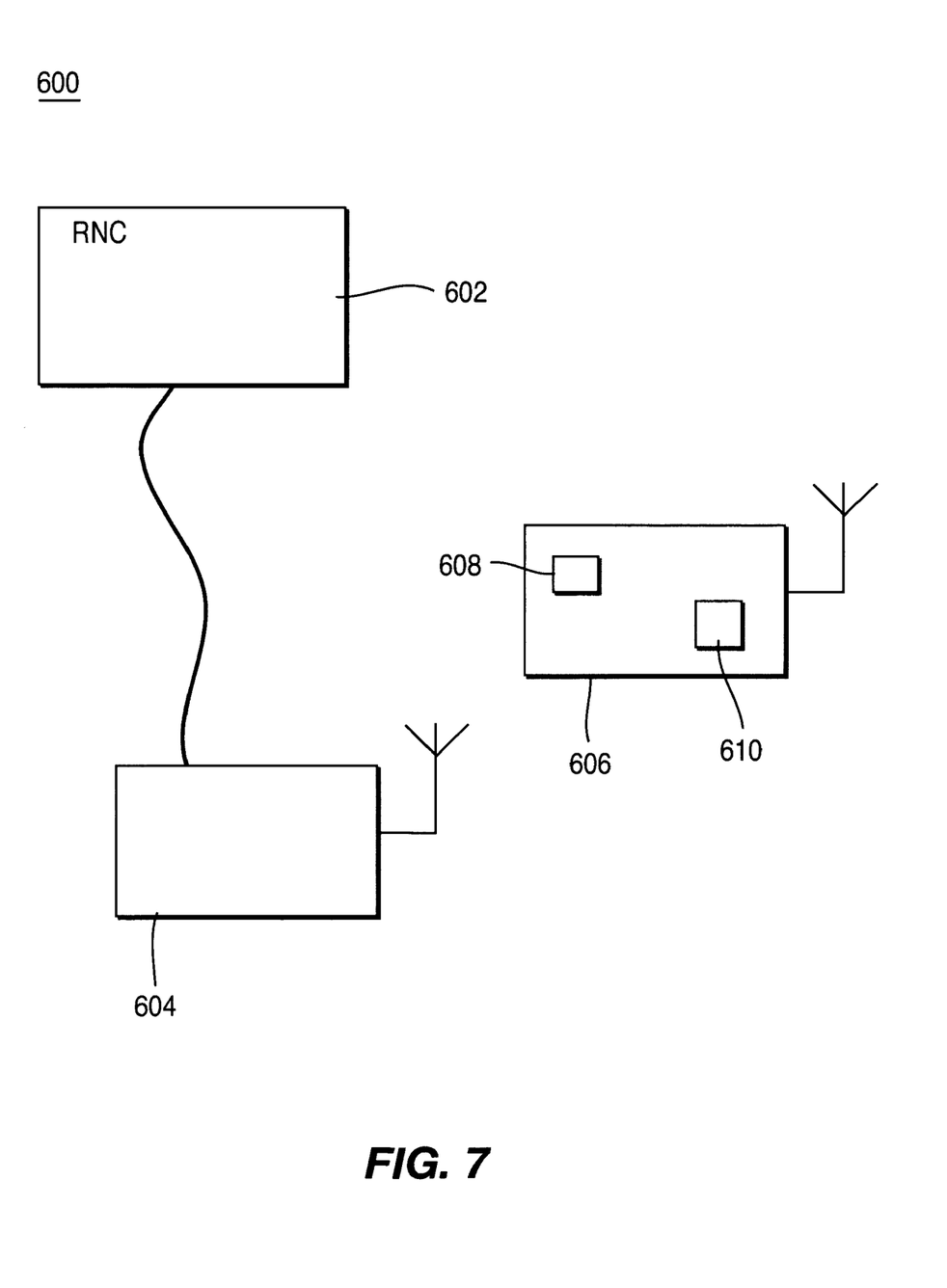
FIG. 7 is a wireless communication system in accordance with the present invention.

Referring now to FIG. 7, there is shown a wireless communication system 600 in accordance with the present invention. The system 600 includes a radio network controller 602, at least one base station 604, and at least one WTRU 606. The WTRU 606 is configured to perform exhaustive and non-exhaustive initial cell searches as described herein.

More specifically, the WTRU 606 includes a storage medium 608 for storing frequencies, either stored or initial. The storage medium may be a built-in memory or any type of removable storage medium or SIM card. The WTRU 606 further includes a processor 610 configured to perform the methods and teachings described herein. That is, generally, processor 610 is configured to perform an exhaustive initial cell search on any stored frequencies. If the WTRU 606 is not able to find a suitable cell by running the exhaustive cell search on the stored frequencies, the WTRU's 606 processor 610 will perform a non-exhaustive search on the initial frequencies. If the WTRU 606 is still not able to find a suitable cell, the processor 610 will perform an exhaustive initial cell search on any initial frequencies wherein an unsuitable cell was detected. If a suitable cell is not found by searching the initial frequencies, service is currently unavailable. It is noted that the storage medium 608 or memory is used to store rejected chip-offsets in a rejected chip-offset list. The memory may be used to store frequencies, cell IDs, PLMN IDs, or any other information associated with performing the teachings described herein.

Of course, it is noted that memory 608 and processor 610 may be any number of memories and/or processors, as desired, for performing the methods and teachings of the present invention.

It is important to note that the present invention may be implemented in any type of wireless communication system, as desired. By way of example, the present invention may be implemented in UMTS-FDD, UMTS-TDD, TDSCDMA, CDMA2000 or any other type of wireless communication system. Further, while the present invention has been described in terms of various embodiments, other variations, which are within the scope of the invention as outlined in the claim below will be apparent to those skilled in the art.

What is claimed is:

1. A method for performing initial cell search, the method comprising:
    performing an exhaustive initial cell search on stored frequencies wherein the exhaustive initial cell search includes:
    maintaining a list of any chin-offset locations that lead to unsuitable cells characterized as step 1 of the initial cell search, wherein step 1 of the initial cell search includes a wireless transmit/receive unit (WTRU) looking for a primary synchronization code (PSC) correlator peak location with the highest power;
    generating a mask for said chip-offset locations, characterized as step 2 of the initial cell search, so that subsequent step 1 of the initial cell search will not detect any PSCs in the masked chip-offset locations;
    performing a non-exhaustive initial cell search on initial frequencies on a condition that no cell is found from the exhaustive initial cell search on stored frequencies; and
    performing an exhaustive initial cell search on initial frequencies on a condition that no cell is found or an unsuitable cell is detected from the non-exhaustive initial cell search on initial frequencies.

2. The method of claim 1 wherein the exhaustive initial cell search includes step 3 of the initial cell search, which determines a scrambling code and unique midamble base identification number, wherein the chip-offset locations that lead to unsuitable cells are obtained after step 3 processing by reading a detected cell's broadcast channel (BCH) to identify the public land mobile network identifier (PLMN ID) of the detected cell.

3. The method of claim 1 wherein the chip-offset locations that lead to unsuitable cells are maintained in a rejected chip-offset list.

4. The method of claim 1 wherein the mask that is generated includes five chips before and after the chip-offset that led to the rejected PSC in the masked chip-offset location.

5. A method for performing an exhaustive initial cell search, the method comprising the steps of:

performing a step 1 of an initial cell search, wherein any rejected chip-offsets are masked so that any primary synchronization codes (PSCs) located within the rejected chip-offsets are excluded, wherein step 1 of the initial cell search includes a wireless transmit/receive unit (WTRU) looking for a PSC correlator peak location with the highest power;

decreasing the gain setting where no detection is made while performing step 1 initial cell search;

running a step 2 of the initial cell search where there is a detection while performing step 1 of initial cell search, wherein step 2 of the initial cell search includes determining the timeslot offset of the detected PSC location and the code group using secondary synchronization codes (SSCs) transmitted along with the detected PSC;

running a step 3 of the initial cell search where there is a detection while performing step 2 of initial cell search, wherein step 3 of the initial cell search includes determining the scrambling code and unique midamble base identification number;

reading the broadcast channel of a cell to obtain the public land mobile network identifier (PLMN ID) detected while performing step 3 of the initial cell search; determining whether the detected cell is unsuitable based on the PLMN ID of the detected cell; and adding to a rejected chip-offset list, the chip-offset of the detected PSC wherein the detected PSC led to the detected cell and the detected cell ID is unsuitable.

6. The method of claim 5, wherein rejected cells are associated with the cell's code group so that rejected code groups are detected in step 2 of the initial cell search thereby avoiding the performance of step 3 of the initial cell search on what will lead to an unsuitable cell.

\* \* \* \* \*

UNITED STATES PATENT AND TRADEMARK OFFICE
CERTIFICATE OF CORRECTION

PATENT NO. : 7,689,235 B2
APPLICATION NO. : 12/001162
DATED : March 30, 2010
INVENTOR(S) : Demir et al.

Page 1 of 1

It is certified that error appears in the above-identified patent and that said Letters Patent is hereby corrected as shown below:

IN THE CLAIMS

At claim 1, column 10, line 36, before the word "locations" delete "chin-offset" and insert therefor --chip-offset--.

Signed and Sealed this
Eighth Day of March, 2011

David J. Kappos
*Director of the United States Patent and Trademark Office*